United States Patent
Adler et al.

(10) Patent No.: US 7,758,839 B2
(45) Date of Patent: Jul. 20, 2010

(54) SILICON AND METHOD FOR PRODUCING THE SAME

(75) Inventors: Peter Adler, Rheinfelden (DE); Andreas Gölz, Maulburg (DE); Holger Kirchner, Friedrichsdorf (DE); Armin Müller, Freiberg (DE); Torsten Sill, Freiberg (DE); Raymund Sonnenschein, Frankfurt (DE)

(73) Assignee: Joint Solar Silicon GmbH & Co. KG, Freiberg (DE)

( * ) Notice: Subject to any disclaimer, the term of this patent is extended or adjusted under 35 U.S.C. 154(b) by 309 days.

(21) Appl. No.: 11/569,774

(22) PCT Filed: May 10, 2005

(86) PCT No.: PCT/EP2005/005018

§ 371 (c)(1),
(2), (4) Date: Nov. 29, 2006

(87) PCT Pub. No.: WO2005/118474

PCT Pub. Date: Dec. 15, 2005

(65) Prior Publication Data

US 2008/0279748 A1   Nov. 13, 2008

(30) Foreign Application Priority Data

Jun. 4, 2004   (DE) .............. 10 2004 027 563

(51) Int. Cl.
  C01B 33/29   (2006.01)
  C01B 33/27   (2006.01)
  C01B 33/02   (2006.01)
  F16C 13/00   (2006.01)

(52) U.S. Cl. .............. 423/348; 335/342; 335/347; 335/349; 335/350; 241/222; 241/227; 241/228; 492/48; 492/57; 492/58; 492/59

(58) Field of Classification Search ............ 423/335, 423/342, 347, 348, 349, 350; 241/222, 227, 241/228; 492/48, 57–59; F16C 13/00; C01B 33/02, C01B 33/27, 33/29
See application file for complete search history.

(56) References Cited

U.S. PATENT DOCUMENTS 4,354,987 A   10/1982  Iya et al.

(Continued)

FOREIGN PATENT DOCUMENTS

JP   57067019 A   *   4/1982

(Continued)

OTHER PUBLICATIONS

C. J. Santana et al., "The Effects of Processing Conditions on the Density and Microstructure of Hot-Pressed Silicon Powder", Journal of Materials Science, Chapman and Hall Ltd., London, GB, Bd. 31, 1996, Seiten 4985-4990, XP000892023 ISSN: 0022-2461.

Primary Examiner—Melvin C Mayes
Assistant Examiner—Jun Li
(74) Attorney, Agent, or Firm—McGlew and Tuttle, P.C.

(57) ABSTRACT

Method for producing silicon which is suitable as a starting material for producing a silicon melt for the fabrication of silicon blocks or silicon crystals, comprising the following steps: introducing a gaseous mixture of monosilane and hydrogen into a reactor, thermal degrading the gaseous mixture for forming silicon powder, separating the formed silicon powder produced from the gaseous mixture, and mechanical compacting the separated silicon powder with compacting rollers which having a roller jacket consisting of a ceramic material selected from graphite, glass and silicon nitride.

34 Claims, 2 Drawing Sheets

U.S. PATENT DOCUMENTS

| | | | |
|---|---|---|---|
| 4,661,335 A | | 4/1987 | Boudot et al. |
| 4,739,715 A | * | 4/1988 | Couarc'h et al. ............ 110/346 |
| 4,807,819 A | * | 2/1989 | Kreher et al. ............... 241/222 |
| 4,883,687 A | | 11/1989 | Gautreaux et al. |
| 5,139,762 A | * | 8/1992 | Flagella ..................... 423/349 |
| 2005/0084560 A1 | * | 4/2005 | Roland ....................... 425/363 |

FOREIGN PATENT DOCUMENTS

| | | | |
|---|---|---|---|
| JP | 2004136294 | * | 5/2004 |
| WO | WO 2004/011372 | | 2/2004 |

* cited by examiner

SILICON AND METHOD FOR PRODUCING THE SAME

BACKGROUND OF THE INVENTION

1. Field of the Invention

The invention relates to a method for producing high-purity silicon, silicon produced according to the method, and silicon fusible in a particular manner.

2. Background Art

Methods for producing high-purity silicon have been known for a long time. The Prime Poly silicon resulting from said methods is because of its production process a compact material which is used in the form of rodlets, approximately spherical granules or irregular solid pieces of silicon. Said materials have because of their compact structure very good melting properties, because of the slow thermal precipitation a high purity, and because of the high volume/surface ratio only slight surface impurities, which are incorporated in the melt. Disadvantages of the existing methods are a very high specific energy consumption per kilogram of pure silicon and, because of the slow precipitation rate, the high costs of manufacture.

In many of the methods for producing Prime Poly silicon investigated in the past, and in the production methods currently used industrially, apart from the silicon deposited on a hot surface, powdery silicon is mainly obtained in the gas phase, in particular when monosilane is used. Because of its high content of impurities, poor handling properties and poor melting characteristics, said powdery silicon was not able to be used to date in the photovoltaic and semiconductor industry. A targeted development of a suitable method for producing silicon in the form of silicon powder is described in the literature. Because of the unfavourable melting characteristics of silicon powder, it was proposed that silicon powder be converted directly into a silicon melt and allowed to solidify in the form of silicon granules, in order to act in said form as the starting material for the production of silicon blocks or silicon crystals (U.S. Pat. No. 4,354,987).

SUMMARY OF THE INVENTION

The invention is based on the object of creating a method for producing silicon which leads, with savings on energy and costs, to a pure silicon which can be processed easily.

The object is achieved by a method for producing silicon comprising the steps of introducing a gaseous mixture of a silicon-containing gas and an auxiliary gas into a reactor, thermal degradating the gaseous mixture with formation of silicon powder, separating of the silicon powder obtained from the gaseous mixture, and mechanical compacting of the separated silicon powder. This object is also achieved by silicon being produced by the introduction of a gaseous mixture of a silicon-containing gas and an auxiliary gas into a reactor, the thermal degradation of the gaseous mixture with formation of silicon powder, the separation of the silicon powder obtained from the gaseous mixture, and the mechanical compacting of the separated silicon powder. This object is also achieved by silicon being present in the form of at least one of a powder of silicon particles and of a compressed powder of silicon particles, having a mean bulk density of 100 to 1500 $g/dm^3$, and being fusible to a homogeneous silicon melt at a temperature of not more than 1500° C. The core of the production method consists in thermally degrading a monosilane-hydrogen mixture and mechanically compacting the silicon powder obtained. Said silicon possesses the properties that it is processable later without difficulty and is fusible in particular at melting temperatures in the region of the melting temperature of silicon. By virtue of the production process the silicon in particular contains no silicon oxide compounds on the surface of the silicon particles which would increase substantially the melting temperature of the silicon powder.

Additional features and details of the invention will be described below with reference to two embodiments.

DESCRIPTION OF THE PREFERRED EMBODIMENTS

Figure 1:
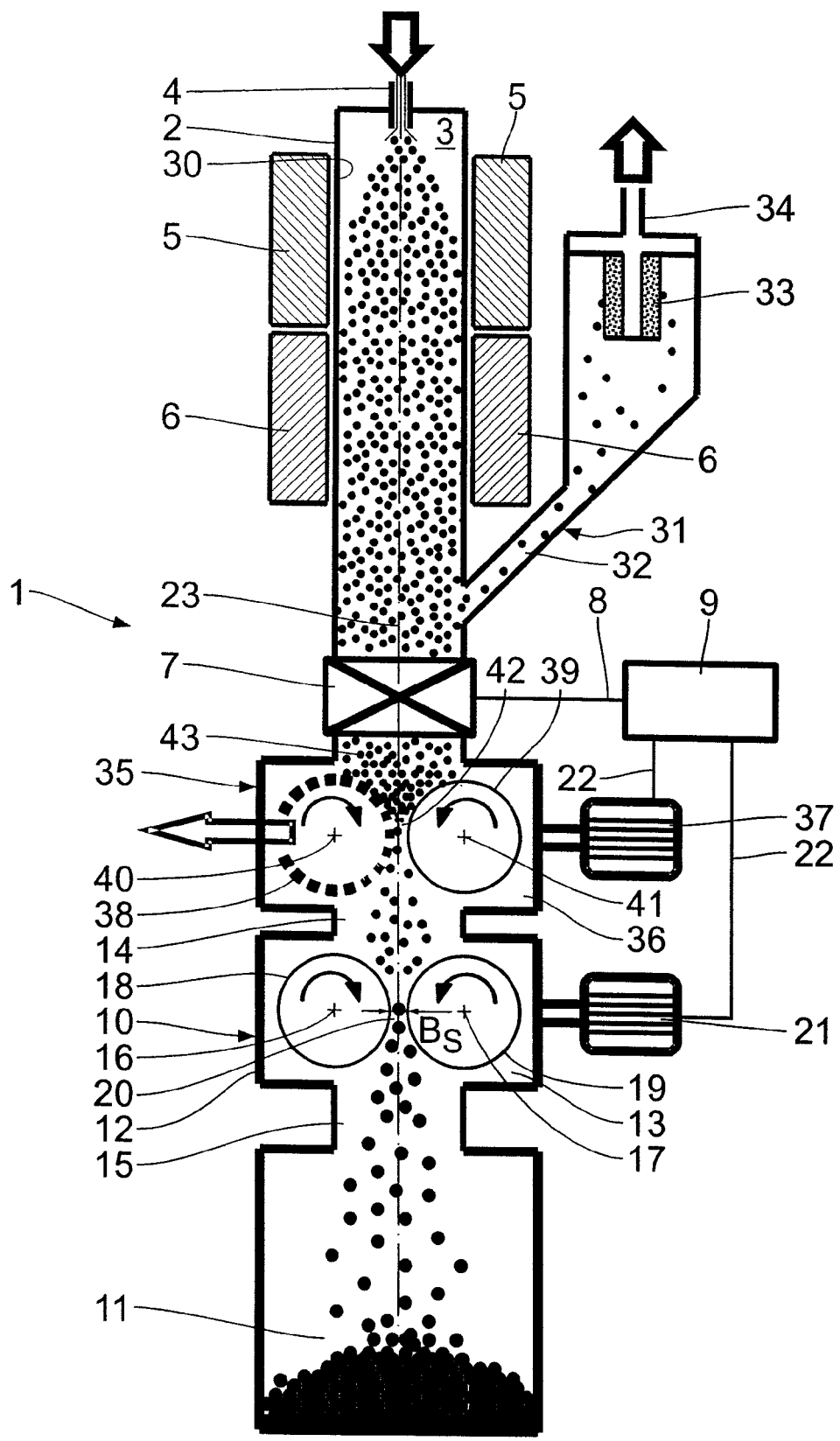
FIG. 1 shows a cross-section of a plant for producing silicon with a compacting device according to a first embodiment.
Figure 2:
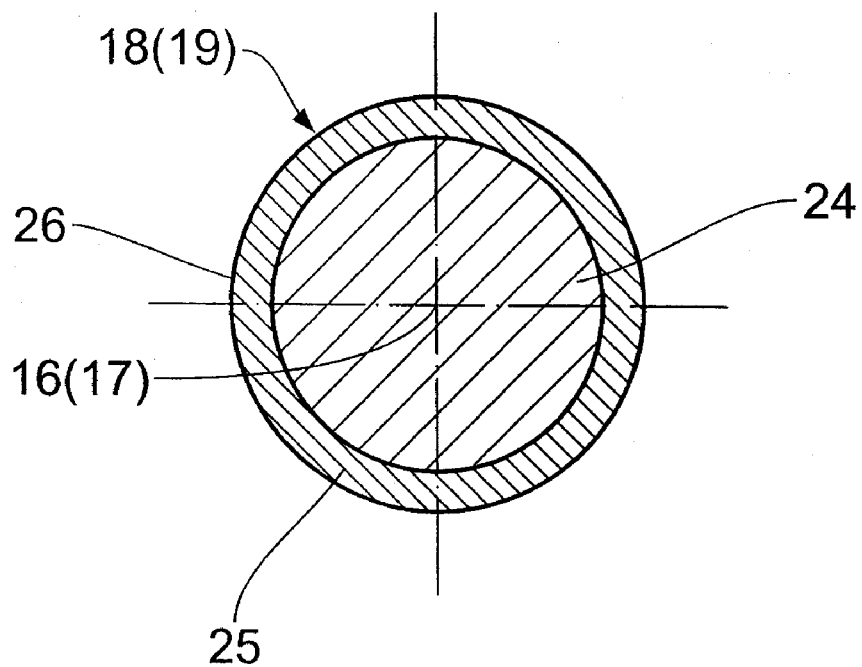
FIG. 2 shows an enlarged view of a compacting roller of the compacting device according to FIG. 1

There will be described first of all below with reference to FIGS. 1 and 2 the layout of a plant 1 for producing silicon powder according to a first embodiment. The plant 1 comprises, starting from the top, a tube-shaped, vertically extending reactor 2 which encloses a cylindrical reaction chamber 3. At the upper end of the reactor 2 is arranged a gas feed line 4 which merges into the reaction chamber 3. The line 4 is so formed that a useful gas flow, for example of monosilane, can be introduced in the middle. The useful gas flow is surrounded by a circular flow of an auxiliary gas. Roughly the upper half of the reactor 2 is surrounded by a cylindrical heater 5 which surrounds the reactor 2 in such a way that the wall of the chamber 3 can be heated to temperatures of more than 800° C. The lower half of the reactor 2 is surrounded by a cylindrical cooling device 6 which directly abuts the reactor 2. Below the reactor 2, and connected thereto, is located a degassing device 31 and an electrically operated air lock 7 which is connected via a connecting line 8 to a control device 9. The degassing device 31 consists of a casing 32 extending diagonally upwards and connected to the chamber 3, said casing 32 being added onto the bottom end of the reactor 2. At the upper end of the casing 32 is attached a cylindrical sintered material filter 33 sealed at the bottom, through which surplus hydrogen can escape through an opening 34 made in the upper end of the casing 32. Below the air lock 7 is located a roller vent unit 35 of a known type and then a compacting device 10 the layout of which will be described in detail below. The compacting device 10 is connected to the reaction chamber 3 via the air lock 7. Below the device 10 is located a storage vessel 11 connected thereto.

The roller vent unit 35 comprises a cuboid casing 36 in which are arranged two vent rollers 38, 39 driven by a motor 37. The rollers 38, 39 are rotatable about associated axes of rotation 40, 41 extending parallel to one another. The rollers 38, 39 are driven in opposite directions, so that in the region of the gap 42 bounded by the rollers 38, 39 both move downwards. The roller 38 is hollow and possesses a porous jacket. On its jacket surface is fitted a gas-permeable plastics film. A vacuum exists within the roller 38. In this way the gas remaining in the silicon powder 43 is drawn off. The surface of the roller 39 is smooth. Both the rollers 38, 39 preferably possess a non-metallic surface.

The compacting device 10 comprises a casing 12 which surrounds a substantially cubic working chamber 13. The casing 12 comprises a feed opening 14 facing the air lock 7 and connected thereto, as well as a discharge opening 15 provided on the bottom edge of the casing 12 and connected to the vessel 11. In the casing 12 are located centrally between the openings 14 and 15 two compacting rollers 18, 19 rotatable about respective axes of rotation 16, 17, said compacting rollers 18, 19 being arranged adjacent to one another in such a way that a compacting gap 20 is formed between them. The axes of rotation 16 and 17 extend parallel to one another. The compacting gap 20 exhibits a width Bs. The compacting rollers 18, 19 are rotatable via a motor 21, which is connected to the control device 9 via a connecting line 22. The tube-shaped reactor 2 comprises a vertically extending central longitudinal axis 23, which runs through the centre of the gap 20. The rollers 18, 19 are driven in opposite directions, i.e. the roller 19 turns in a clockwise direction, the roller 19 in an anti-clockwise direction. As a result, the surfaces of the rollers 18, 19 move jointly downwards in the region of the gap 20.

The rollers 18, 19 exhibit a roller core 24 consisting of steel, which has the shape of a regular cylinder. On the roller core 24 is located a roller jacket 25 circular in cross-section, which peripherally surrounds the roller core 24 completely. The roller jacket 25 is formed of one piece and consists of a non-metal material, that is to say a non-metallic material. Glass, graphite or ceramic materials are in particular involved here. Ceramic is particularly preferred. The ceramic used consists in particular substantially of silicon nitride. The roller jacket 25 is fixed to the roller core 24 in axial and tangential direction, for example by bonding or groove and tongue joints. The roller jacket 25 has the shape of a regular cylinder. It is possible for the whole of roller 18 or 19 to be formed of a ceramic material. In this case the division between a roller core 24 of steel and a roller jacket 25 of ceramic does not apply. The embodiment according to FIG. 2 is more stable and more advantageous above all in terms of the application of torsional moments to the surface 26 of the jacket 25.

Figure 3:
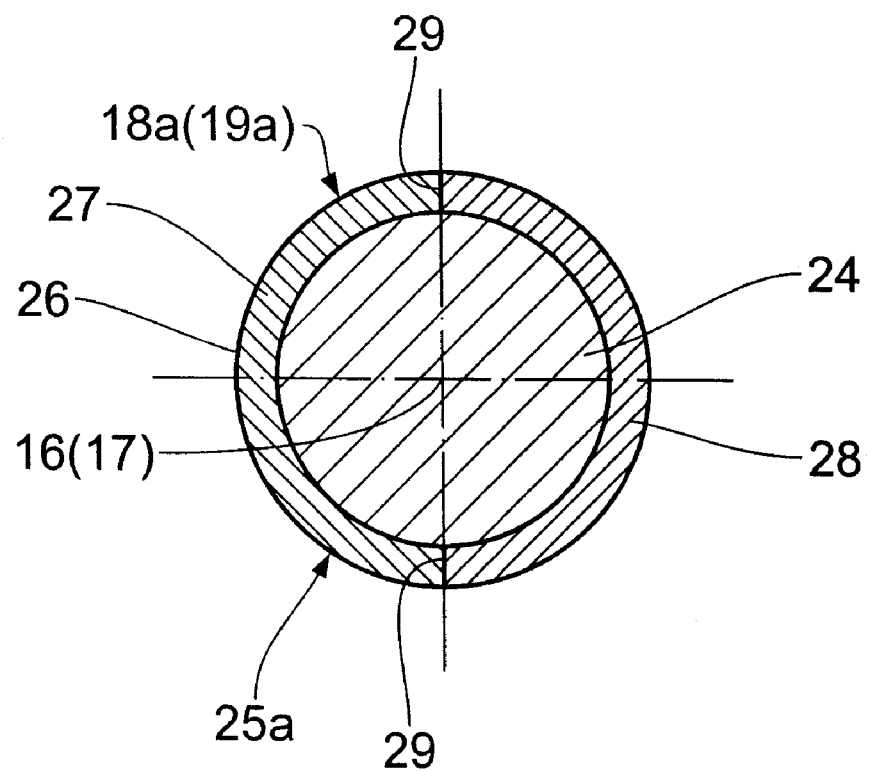
FIG. 3 shows an enlarged view of a compacting roller according to a second embodiment.

FIG. 3 shows a second embodiment. Identical parts receive the same reference symbols as in the embodiment according to FIG. 2. Parts differing in construction but identical in function receive the same reference symbols with an added a. The main difference compared with the embodiment according to FIG. 2 consists in the fact that the roller jacket 25a is not formed of one piece, but consists of two half shells 27 and 28 which enclose the roller core 24 completely and without interruption. In particular the gaps 29 between the half shells 27 and 28 are sealed completely and without interruption, so that material that gets onto the surface 26 does not come into contact with the roller core 24. After the ceramic fabrication the half shells 27, 28 were subjected to an exact machining. As part of the machining, the surface of the half shells 27, 28 was profiled. The surface of the half shells 27, 28 can also be so formed that the compacted silicon possesses the shape of rodlets, pads, almonds etc. Despite the high specific contact pressures occurring, the material combination of ceramic and metal withstood the machining. It is also possible to use part shells with a centre angle of <180° on the periphery. In particular, three part shells with a centre angle of 120° or four part shells with a centre angle of 90° can be provided on the periphery. Other subdivisions are also possible.

The process for producing silicon will first of all be described below by means of an example. A gaseous mixture of monosilane and hydrogen in the volume or molar ratio 1:3 was reacted in the reactor 2 with a wall temperature of the wall 30 of >800° C. and a production rate of 200 g of silicon per hour to silicon powder and hydrogen. The feeding took place in such a way that the monosilane was introduced centrally from above into the reaction chamber 3. The hydrogen surrounded the monosilane in the form of a circular current in order to prevent the silicon being deposited directly on the walls of the reaction chamber 3, After the degrading the silicon powder 43 was partially degassed by means of the degassing device 31 arranged on the air lock 7. The powder obtained possessed a bulk density of approx. 50 g/l. In the reaction chamber 3 an excess pressure of 200 mbar compared with the ambience was applied. In this way the degassing in the degassing device 31 took place automatically in the face of the ambient pressure. In the case of the silicon powder the hydrogen atmosphere in the powder was replaced with an inert gas, e.g. argon or nitrogen, in two steps by means of the roller vent unit 35 and the compacting device 10. The vented and pre-compressed product with a bulk density of approx. 200 g/dm$^3$ was compressed by means of the compacting device 10 to a bulk density of 450 g/dm$^3$. 6 kg of said compacted silicon powder were placed in an induction melting plant IS30 of the firm Leybold. The plant was then evacuated. An argon atmosphere with a pressure of between 1 and 100 mbar was generated. The silicon powder was heated to a melt temperature of 1415° C. Residue-free melting of the silicon powder then took place at 1450° C. in 30 minutes with a melting power of 70 kW. After this the silicon melt was poured off and controlled solidification of the silicon brought about. The solidified polycrystalline silicon block showed a homogeneous polycrystalline structure of the silicon, and no residues of silicon powder or silicon-containing slag.

The following applies in general to the process according to the invention: In general a silicon-containing gas can be degraded in the reactor. Examples of this are trichlorosilane or monosilane. Other silicon-containing gases can also be used. The silicon-containing gas is introduced centrally into the tube-shaped reactor 2 and is in so doing surrounded by a circular current of an auxiliary gas, in order that the silicon-containing gas is not deposited directly on the reactor walls. The auxiliary gas can in general be an inert gas. Hydrogen is particularly advantageous, since it is also formed during the degrading, for example, of monosilane. Noble gases such as argon can also be used, however, as well as other gases such as e.g. nitrogen or carbon dioxide. The mixture ratio, i.e. volume or molar ratio, of monosilane to hydrogen can lie between 1:0 and 1:100. The specific energy requirement per 1 kg of solid silicon for the process steps of thermal degradation and mechanical compacting was less than 20 kWh. The space-time yield per tube-shaped reactor 2 was more than 1 kg of silicon powder per hour. The wall temperature of the reactor 2 was more than 400° C., in particular more than 800° C. The compacting of the silicon powder can take place in one or two stages, with advantage in two stages. The contact pressures in the compacting device 10 were between 5 N/cm and 50 kN/cm.

It is of central importance that the compacting of the silicon powder in the device 10 takes place metal-free and that no metal contamination of the silicon powder therefore takes place. This is ensured by the fact that the silicon powder comes into contact exclusively with the ceramic roller jacket 25.

The high-purity powdery silicon produced by the method according to the invention possesses, despite its powdery normal state, good handling properties and is suitable for the production of pure silicon melts, from which silicon blocks or silicon crystals can be produced. It has been found that it is possible with the defined composition of the pyrolysis gas consisting of hydrogen and monosilane to produce silicon in powder form with high yields and very low energy consumption. The process is particularly distinguished by the fact that after the carrying out of the method the silicon powder can be handled, packaged and dispatched separately and thus be used with a time delay for the production of silicon blocks or silicon crystals. The silicon is distinguished by good melting characteristics and a high purity, despite a large surface region and an unfavourable, small volume/surface ratio compared with Prime Poly silicon.

The silicon powder produced by the thermal degrading possessed a bulk density of 10 to 100 g/dm$^3$. The silicon powder fully compacted by the compacting device 10 possessed a bulk density of 100 to 1500 g/dm$^3$, in particular of 200 to 1200 g/dm$^3$, in particular of 250 to 950 g/dm$^3$, in particular approx. 450 g/dm$^3$. The silicon powder contained overall not more than $10^{19}$ atoms of foreign elements per 1 cm$^3$ of silicon. The silicon powder consisted of crystalline particles with a primary particle size of 10 nm to 10,000 nm, preferably 50 nm to 500 nm, typically approx. 200 nm. The compacted silicon powder consisted of aggregates with an aggregate size of 500 nm to 100,000 nm, in particular 1000 to 10,000 nm, typically about 4000 nm. The compacted silicon pieces of silicon aggregates possessed a maximum extension of 1 to 200 mm. They possessed an irregular form, it being possible for rodlets also to be involved. The silicon powder possessed a surface of 1 to 50 m$^2$/g. The compacted silicon powder possessed overall not more than $10^{17}$ atoms of transition metals per 1 cm$^3$ of silicon. The silicon powder according to the invention has a brown color, whereas silicon granules produced by traditional methods are grey. The compacted silicon powder can be used to produce polycrystalline silicon blocks for the photovoltaic industry or to produce silicon monocrystals. Silicon wafers can be produced from the silicon according to the invention. The metal content of the compacted silicon powder corresponded to that of the starting product. No impurities were found. As a result of the production process the silicon contained no silicon oxide compounds on the surface of the silicon particles that would have increased significantly the melting temperature of the silicon powder.

The invention claimed is:

1. A method for producing silicon which is suitable as a starting material for producing a silicon melt for the fabrication of silicon blocks or silicon crystals, the method comprising the steps of:
   providing a reactor;
   introducing a gaseous mixture of a silicon-containing gas and an auxiliary gas into said reactor;
   thermally degrading said gaseous mixture with formation of silicon powder;
   separating said silicon powder obtained from said gaseous mixture to provide silicon powder material having a density of 10 g/dm$^3$ to 100 g/dm$^3$ and consisting of crystalline particles with a primary particle size of 50 nm to 500 nm; and
   mechanically compacting said separated silicon powder to provide compacted silicon powder material having a density of 200 g/dm$^3$ to 1200 g/dm$^3$ and consisting of aggregates with an aggregate size of 1000 nm to 10,000 nm with compacting rollers such that said compacted silicon powder is not contaminated with metal, each compacting roller having a roller jacket, said roller jacket consisting of a ceramic material selected from glass, graphite and silicon nitride.

2. A method according to claim 1, wherein said silicon-containing gas is monosilane.

3. A method according to claim 1, wherein said auxiliary gas is hydrogen.

4. A method according to claim 1, wherein the thermal degradation is carried out in a tube reactor with a yield per tube reactor of more than 1 kg of silicon powder per hour.

5. A method according to claim 1, wherein the reactor has a wall temperature of more than 400° C. during thermal degradation.

6. Silicon produced by the method according to claim 1.

7. A method according to claim 1, wherein said ceramic is silicon nitride.

8. A method according to claim 1, wherein said silicon-containing gas is introduced centrally into said reactor such that a circular current of said auxiliary gas surrounds said silicon-containing gas.

9. A method according to claim 1, wherein compacted silicon pieces of silicon aggregates have a maximum extension of 1 to 200 mm.

10. A method according to claim 1, wherein said auxiliary gas is an inert gas or a noble gas.

11. A method according to claim 1, wherein the compacted silicon power material has a density of 250 g/dm$^3$ to 950 g/dm$^3$.

12. A method according to claim 1, wherein the compacting of said separated silicon powder takes place with a contact pressure between 5 N/cm and 50 kN/cm.

13. A method according to claim 1, wherein said compacted silicon power in total does not possess more than $10^{17}$ atoms of transition metals per 1 cm$^3$ of silicon.

14. A method according to claim 1, wherein each of said compacting rollers comprise a roller core consisting of metal, said roller jacket being fixed to said roller core via bonding.

15. A method for producing silicon which is suitable as a starting material for producing a silicon melt for the fabrication of silicon blocks or silicon crystals, the method comprising the steps of:
   providing a reactor;
   providing an air lock;
   providing a casing, said casing defining a working chamber, said casing being connected to said reactor via said air lock;
   introducing a gaseous mixture of a silicon-containing gas and an auxiliary gas into said reactor;
   forming silicon powder by thermal degradation of said gaseous mixture to provide silicon powder material having a density of 10 g/dm$^3$ to 100 g/dm$^3$ and consisting of crystalline particles with a primary particle size of 50 nm to 500 nm;
   separating said silicon powder obtained from said gaseous mixture; and
   mechanically compacting said separated silicon powder to provide compacted silicon powder material having a density of 200 g/dm$^3$ to 1200 g/dm$^3$ and consisting of aggregates with an aggregate size of 1000 nm to 10,000 nm, said compacting being provided in said working chamber, wherein said silicon powder is mechanically compacted with compacting rollers, each of said compacting rollers having a roller jacket, said roller jacket consisting of a ceramic material selected from glass, graphite and silicon nitride.

16. A method according to claim 15, wherein said air lock is electrically operated.

17. A method according to claim 15, wherein said air lock is connected to a control device.

18. A method according to claim 15, wherein said compacting rollers are rotated via a motor, said motor being connected to said control device.

19. A method according to claim 15, wherein compacted silicon pieces of silicon aggregates have a maximum extension of 1 to 200 mm.

20. A method according to claim 15, wherein said auxiliary gas is an inert gas or a noble gas.

21. A method according to claim 15, wherein the compacted silicon power material has a density of 250 g/dm$^3$ to 950 g/dm$^3$.

22. A method according to claim 15, wherein the compacting of said separated silicon powder takes place with a contact pressure between 5 N/cm and 50 kN/cm.

23. A method according to claim 15, wherein said compacted silicon power in total does not possess more than $10^{17}$ atoms of transition metals per 1 cm$^3$ of silicon.

24. A method according to claim 15, wherein each of said compacting rollers comprise a roller core consisting of metal, said roller jacket being fixed to said roller core via bonding.

25. A method for producing silicon which is suitable as a starting material for producing a silicon melt for fabricating silicon blocks or silicon crystals, the method comprising the steps of:
providing a reactor;
introducing a gaseous mixture of a silicon-containing gas and an auxiliary gas into said reactor;
thermally degrading said gaseous mixture such that silicon powder is formed;
separating said silicon powder obtained from said gaseous mixture to provide silicon powder material having a density of 10 g/dm$^3$ to 100 g/dm$^3$ and consisting of crystalline particles with a primary particle size of 50 nm to 500 nm;
drawing off gas remaining in said silicon powder; and
mechanically compacting said separated silicon powder to provide compacted silicon powder material having a density of 200 g/dm$^3$ to 1200 g/dm$^3$ and consisting of aggregates with an aggregate size of 1000 nm to 10,000 nm, wherein said step of mechanically compacting said silicon powder is performed via a compacting device, said compacting device comprising compacting rollers, each of said compacting rollers having a roller jacket, said roller jacket consisting of a ceramic material selected from the glass, graphite and silicon nitride.

26. A method according to claim 25, wherein a roller vent unit is used to draw off said remaining gas from said silicon powder.

27. A method according to claim 26, wherein said compacting device being located at a position below said roller vent unit, said compacting device being connected to said reactor via an air lock.

28. A method according to claim 27, wherein said rollers of said vent unit have a non-metallic surface.

29. A method according to claim 25, wherein compacted silicon pieces of silicon aggregates have a maximum extension of 1 to 200 mm.

30. A method according to claim 25, wherein said auxiliary gas is an inert gas or a noble gas.

31. A method according to claim 25, wherein the compacted silicon power material has a density of 250 g/dm$^3$ to 950 g/dm$^3$.

32. A method according to claim 25, wherein the compacting of said separated silicon powder takes place with a contact pressure between 5 N/cm and 50 kN/cm.

33. A method according to claim 25, wherein said compacted silicon powder in total does not possess more than $10^{17}$ atoms of transition metals per 1 cm$^3$ of silicon.

34. A method according to claim 25, wherein each of said compacting rollers comprise a roller core consisting of a metal, said roller jacket being fixed to said roller core via bonding.

* * * * *